United States Patent Office 3,379,762
Patented Apr. 23, 1968

3,379,762
DESACETYLAMINO COLCHICINE
DERIVATIVES
Georges Muller, Nogent-sur-Marne, Roland Bardoneschi, Le Vert-Galant, and André Poittevin, Les Lilas, France, assignors to Roussel-UCLAF, Paris, France, a corporation of France
No Drawing. Filed Nov. 7, 1963, Ser. No. 322,039
Claims priority, application France, Nov. 9, 1962, 914,928; Dec. 21, 1962, 919,491
6 Claims. (Cl. 260—571)

ABSTRACT OF THE DISCLOSURE 1-hydroxymethyl-desacetylamino colchicine compounds having the formula

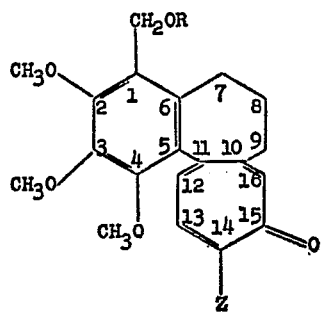

I wherein R is selected from the group consisting of hydrogen, an alkyl radical having 1 to 3 carbon atoms, an acyl radical of an organic carboxylic acid having 1 to 18 carbon atoms, an acyl radical of an organic carbonic acid having 1 to 18 carbon atoms and an anion of a mineral acid and Z is selected from the group consisting of —OCH$_3$, —OCH$_2$—CH$_3$, —SCH$_3$, —SCH$_2$—CH$_3$, and

wherein R' and R" are selected from the group consisting of hydrogen, an alkyl radical having 1 to 8 carbon atoms, an aryl radical and an aralkyl radical nd R' R" together with the nitrogen to form a heterocyclic radical. The invention also relates to novel processes for preparing the said colchicine compounds of Formula I and to novel intermediates formed therein.

The 1-hydroxymethyl desacetylamino colchicine compounds of Formula I are numbered according to the numbering system of colchicine. The compounds can also be numbered according to the RRI 3923 system of Ring Index, 2nd Edition, 1960 as follows:

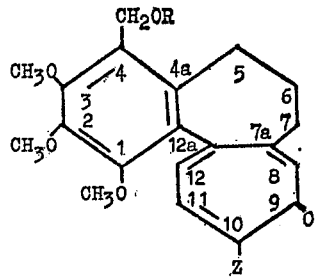

According to the latter numbering system, the compounds of the invention would be 4-hydroxymethyl desacetylamino colchicine compounds.

The new compounds of Formula I can be utilized industrially in agriculture. Thus, they can be utilized as fungicidal agents or for modifications of mitosis and creation of polyploids, either by spreading aqueous solutions or suspensions of the product on cultivated soil, or by previous treatment of the seeds with the products per se or diluted in a solvent or on a support. These compounds can, in addition, serve as intermediate products for the preparation of other colchicinic derivatives.

Objects of the invention

It is an object of the invention to provide the novel 1-hydroxymethyl desacetylamino colchicine compounds of Formula I.

It is another object of the invention to provide novel intermediates for the 1-hydroxymethyl desacetylamino colchicine compounds of Formula I.

It is a further object of the invention to provide novel processes for the preparation of the 1-hydroxymethyl desacetylamino colchicine compounds of Formula I.

These and other objects and advantages of the invention will become obvious from the following detailed description.

The invention

The novel 1-hydroxymethyl desacetylamino colchicine compounds of the invention have the formula

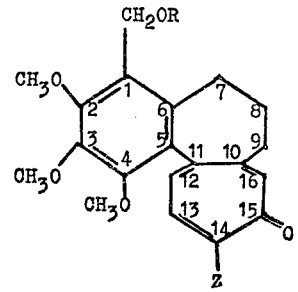

wherein R is selected from the group consisting of hydrogen, an alkyl radical having 1 to 3 carbon atoms, an acyl radical of an organic carboxylic acid having 1 to 18 carbon atoms, an acyl radical of an organic carbonic acid having 1 to 18 carbon atoms and an anion of a mineral acid and Z is selected from the group consisting of —OCH$_3$, —OCH$_2$—CH$_3$, —SCH$_3$, —SCH$_2$—CH$_3$, and

wherein R' and R" are selected from the group consisting of hydrogen, an alkyl radical having 1 to 8 carbon atoms, an aryl radical and an aralkyl radical and R' and R" together with the nitrogen atom form a heterocyclic radical.

The acyl radical of the organic carboxylic acid having 1 to 18 carbon atoms may be derived from an aliphatic, aromatic, cycloaliphatic or heterocyclic carboxylic acid. Examples of suitable acids are alkanoic acids, such as formic acid, acetic acid, propionic acid, butyric acid, isobutyric acid, valeric acid, isovaleric acid, trimethyl acetic acid, caproic acid, β-trimethyl propionic acid, heptanoic acid, caprylic acid, pelargonic acid, capric acid, undecylic acid, lauric acid, myristic acid, palmitic acid and stearic acid; alkenoic acids such as undecylenic acid, linoleic acid, ricinoleic acid and oleic acid; cycloalkyl carboxylic acids such as cyclopentyl carboxylic acid, cyclopropyl carboxylic acid, cyclobutyl carboxylic acid and cyclohexyl carboxylic acid; cycloalkyl alkanoic acids such as cyclopentyl acetic acid, cyclohexyl acetic acid, cyclopentyl propionic acid and cyclohexyl propionic acid; arylalkanoic acids such as phenyl acetic acid and phenyl propionic acid; aryl carboxylic acids such as p-phenyl benzoic acid, p-cyclohexyl benzoic acid, benzoic acid and 2, 4-dinitrobenzoic acid; phenoxy alkanoic acids such as phenoxy acetic acid, p-chlorophenoxy acetic acid, 2,4-dichlorophenoxy acetic acid, 4-ter-butylphenoxy acetic acid, 3-phenoxy propionic acid and 4-phenoxy butyric acid; heterocyclic carboxylic acids such as furane-2-carboxylic acid, 5-ter-butylfurane - 2 - carboxylic acid, 5-bromofurane-2-carboxylic acid and nicotinic acids; β-ketoalkanoic acids, such as acetylacetic acid, propionylacetic acid and butyrylacetic acid; amino acids such as diethylaminoacetic acid and aspartic acid. The anion of the mineral acid may be derived from mineral acids such as nitric acid and phosphoric acid. The corresponding organic carbonic acids may also be used.

One process of the invention for the preparation of 1-hydroxymethyl desacetylamino colchicines of Formula I comprises reacting desacetylamino colchiceine with diazomethane to form a mixture of desacetylamino colchicine and desacetylamino iso-colchicine, separating the said isomers by chromatography, reacting desacetylamino colchicine with 1,1-dichloromethyl methyl ether in the presence of stannic chloride, preferably in the presence of a chlorinated solvent such as chloroform or methylene chloride, followed by the addition of water to form 1-formyl desacetylamino colchicine and reducing the latter with a reducing agent such as an alkali metal borohydride, preferably in a lower alkanol such as methanol or an ether such as tetrahydrofuran, to form 1-hydroxymethyl desacetylamino colchicine which may be esterified by reaction with an acid halide, acid anhydride or ester of chloroformic acid or etherified by reaction with an alkanol in an acidic medium.

The 1-hydroxymethyl desacetylamino colchicine can be reacted with methyl mercaptan or ethyl mercaptan in the absence or presence of an inert organic solvent such as chloroform or tetrahydrofuran with an acid catalyst such as p-toluene sulfonic acid or with an aqueous solution of an alkali metal salt (i.e. sodium, potassium, lithium) of methyl mercaptan or ethyl mercaptan in the absence or presence of an inert organic solvent such as methanol, ethanol, tetrahydrofuran or dioxane to form the corresponding 1-hydroxymethyl desacetylamino thiocolchicine compound.

1-hydroxymethyl desacetylamino colchiceinamides can also be formed from 1-hydroxymethyl desacetylamino colchicine by reacting the latter with a compound having the formula.

$$H-N\begin{matrix}R'\\R''\end{matrix}$$

wherein R' and R'' have the above definitions in an aqueous medium at normal temperatures, i.e. 10° to 40° C., preferably 20° C.

Examples of suitable nitrogen containing compounds are ammonia; primary alkyl amines such as methylamine, ethylamine, propylamine, butylamine, etc.; secondary alkyl amines such as dimethylamine, diethylamine, dipropylamine, methyl ethyl amine, etc.; aryl amines such as aniline, etc.; aralkyl amines such as benzylamine; and heterocyclic compounds such as morpholine, piperidine, piperazine, etc.

As a variation of the process for introducing the 1-hydroxymethyl group into the desacetylamino colchicine derivatives, the said desacetylamino colchicinic derivative is reacted with chloromethyl lower alkyl ether in the presence of stannic chloride to form the corresponding 1-chloromethyl desacetylamino colchicinic derivative and the latter is subjected to alkaline hydrolysis to obtain the desired 1-hydroxymethyl desacetylamino colchicinic derivative.

These reactions are outlined in Table I and it should be noted that while the colchicine derivatives used are those where Z is —OCH₃ and then converted to other derivatives, the other derivatives of colchicine were Z has the above definition could be prepared by an analogous process.

TABLE I

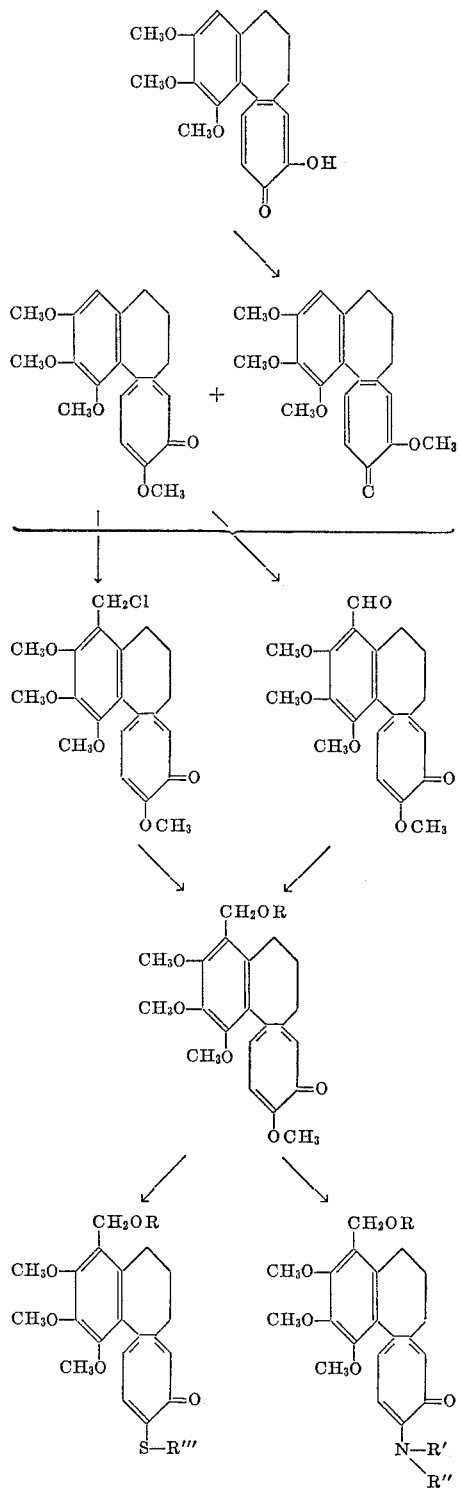

wherein R, R' and R'' have the above definitions and R''' is a methyl or ethyl radical.

To obtain higher yields of the 1-hydroxymethyl desacetylamino colchicine, the desacetylamino iso-colchicine which is separated from desacetylamino colchicine by chromatography can be reacted in an analogous fashion with 1,1-dichloromethyl methyl ether to form 1-formyl desacetylamino iso-colchicine and the latter can then be reduced to form 1-hydroxymethyl desacetylamino iso-colchicine. The said compound can then be hydrolyzed under acidic conditions (i.e., in the presence of hydrochloric acid) to form 1-hydroxymethyl desacetylamino colchiceine which when reacted with diazomethane forms a mixture of 1-hydroxymethyl desacetylamino colchicine and 1-hydroxymethyl desacetylamino iso-colchicine which can be separated by chromatography. The former is recovered and the latter compound can then be recycled to the isomerization step. This reaction is illustrated in Table II.

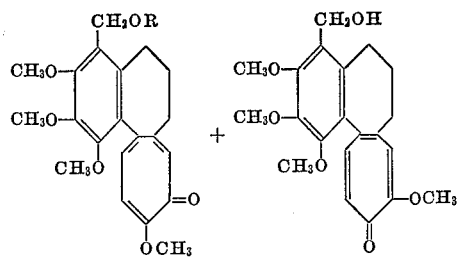

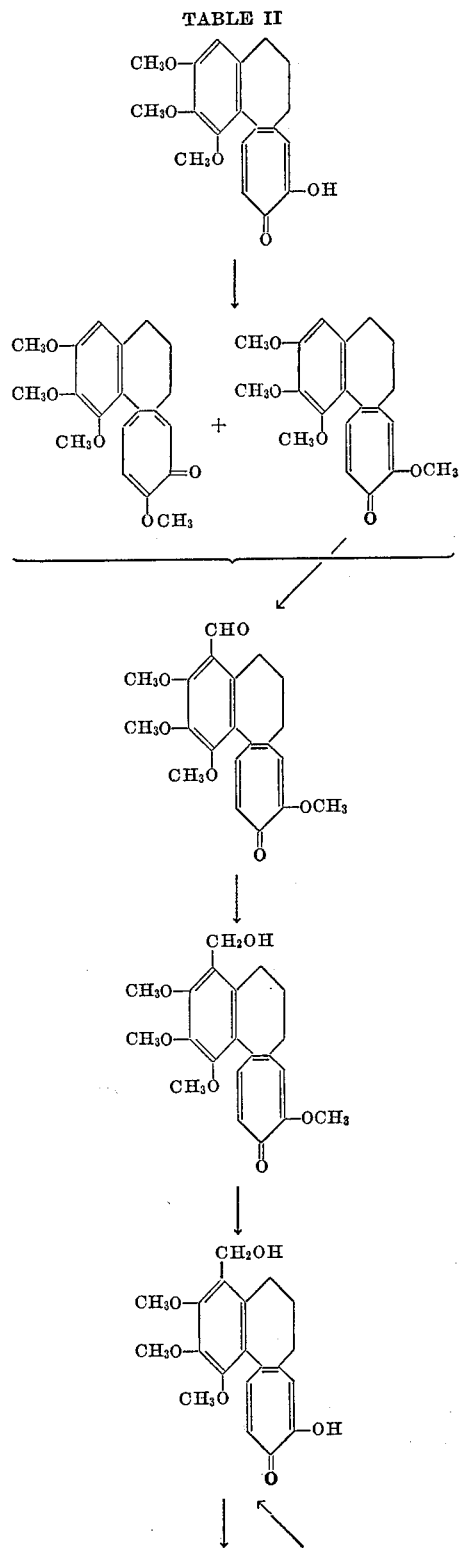

Another variation of the process is to effect the separation of the colchicine and iso-colchicine derivatives after the introduction of the 1-hydroxymethyl group. Desacetylamino colchiceine is reacted with diazomethane to form a mixture of desacetylamino colchicine and desacetylamino iso-colchicine, the said mixture is reacted with 1,1-dichloromethyl methyl ether to form a mixture of 1-formyl desacetylamino colchicine and 1-formyl desacetylamino iso-colchicine and the said mixture is reduced with an alkalimetal borohydride to form a mixture of 1-hydroxymethyl desacetylamino colchicine and 1-hydroxymethyl desacetylamino iso-colchicine which can be separated by chromatography. 1-hydroxymethyl desacetylamino iso-colchicine can then be isomerized and reacted with diazomethane as above described to obtain a further mixture of the 1-hydroxymethylated derivatives which can be again separated by chromatography.

Another process for the preparation of 1-hydroxymethyl desacetylamino colchiceinamides comprises reacting desacetylamino colchicine with a nitrogen containing compound having the formula

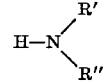

wherein R' and R'' have the above defintions to form the corresponding desacetylamino colchiceinamide, reacting the latter with 1,1-dichloromethyl methyl ether in the presence of stannic chloride to form the corresponding 1-formyl desacetylamino colchiceinamide and reducing the latter with an alkali metal borohydride to form the desired 1-hydroxymethyl desacetylamino colchiceinamide.

The 1-hydroxymethyl desacetylamino thiocolchicine derivatives can be made in an analogous fashion which comprises reacting desacetylamino colchicine with methyl mercaptan or ethyl mercaptan in the presence or absence of an organic solvent with an acid agent such as p-toluene sulfonic acid or with an aqueous solution of an alkali metal salt of methyl mercaptan or ethyl mercaptan to form the corresponding desacetylamino thiocolchicine derivative, reacting the latter with 1,1-dichloromethyl methyl ether to form the corresponding 1-formyl desacetylamino thiocolchicine derivative and reducing the latter with an alkali metal borohydride to form the desired 1-hydroxymethyl desacetylamino thiocolchicine. This alternative procedure is illustrated in Table III.

TABLE III

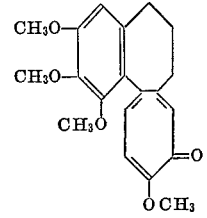

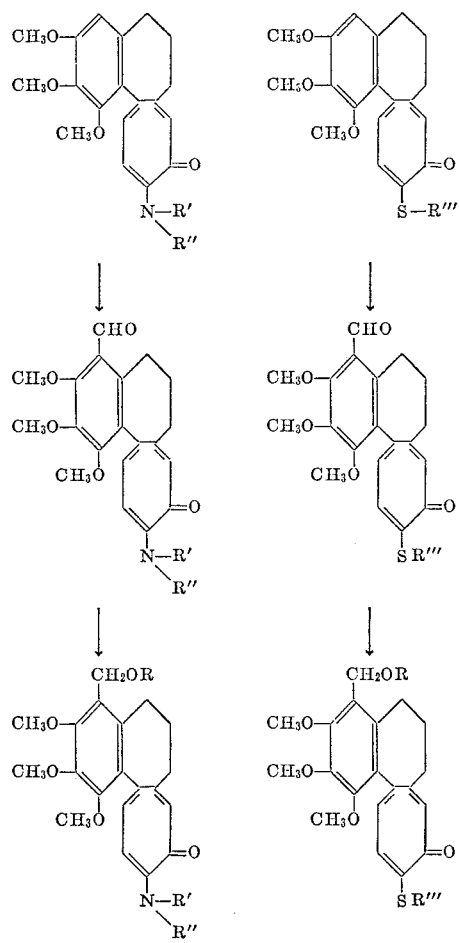

wherein R, R', R'' and R''' have the above definitions.

Examples of compounds which can be prepared according to the invention are 1-hydroxymethyl-desacetylamino-colchicine, 1 - hydroxymethyl-desacetylamino-thiocolchicine, 1 - hydroxymethyl-desacetylamino-colchiceinamide, 1-hydroxymethyl-desacetylamino - N - methyl-colchiceinamide, 1 - hydroxymethyl-desacetylamino-N-ethyl-colchiceinamide, 1-hydroxymethyl-desacetylamino-N-isopropyl-colchiceinamide, 1 - hydroxymethyl-desacetylamino-N,N-dimethyl - colchiceinamide, 1 - hydroxymethyl-desacetyl-amino - N,N - diethyl - colchiceinamide and 1 - hydroxymethyl-desacetylamino - N,N - di - n - propyl-colchiceinamide, as well as the esters or ethers of these compounds, in particular, the esters such as the phosphate, nitrate, formate, acetate, dimethylamino acetate, cyclopropyl acetate, pivalate, propionate, benzoate, hexahydrobenzoate, the mixed carbonate of hexahydrobenzyl alcohol and their ethers, such as the methyl ether, ethyl ether, propyl ether, etc.

In the following examples there are described several preferred embodiments to illustrate the invention. However, it should be understood that the invention is not intended to be limited to the specific embodiments.

Example I.—Preparation of 1-hydroxymethyl desacetyl-amino colchicine

Step A.—Preparation of desacetylamino colchicine and desacetylamino iso-colchicine 6 gm. of desacetylamino colchiceine, obtained according to Schreiber et al. [Helv. Chim. Acta, 44, 540 (1961)] were treated in solution in methylene chloride with a solution of diazomethane in methylene chloride until an excess of the reactant persisted. The excess of the reactant was destroyed with several drops of acetic acid and the reaction mixture was evaporated to dryness under vacuum to form a raw mixture of desacetylamino colchicine and desacetylamino iso-colchicine. The said mixture was subjected to chromatography through a column of magnesium silicate. On elution with methylene chloride, the desacetylamino colchicine having a melting point of 182–184° C. was obtained which compound crystallized from ethyl acetate. By elution with a mixture of methylene chloride and ether (1:1), then by a mixture of methylene chloride and ether (1:1) containing 1% of methanol, desacetylamino iso-colchicine having a melting point of 148° C. was obtained. This compound crystallized from ether.

Step B.—Preparation of 1-formyl desacetylamino colchicine 2 gm. of desacetylamino colchicine having a melting point of 182 to 184° C. were dissolved in 20 cc. of methylene chloride and the reaction mixture was cooled to −5° C. 5 cc. of 1,1-dichloromethyl methyl ether were added thereto and then 1.6 cc. of stannic chloride were added drop by drop. The solution became deep red and passed rapidly to a reddish black oil. The temperature was allowed to rise to 20° C. without agitation and an evolution of hydrochloric acid was produced. At the end of three hours, the reaction mixture was poured onto a mixture of water and ice and this mixture was agitated for a period of 30 minutes and extracted with methylene chloride. The extract was washed with water, with dilute sodium hydroxide and again with water, and evaporated to dryness under vacuum to obtain 2.1 gm. of a product which was subjected to chromatography through a column of magnesium silicate. On elution with methylene chloride containing 5% methanol, 1.52 gm. of 1-formyl desacetyl-amino colchicine having a melting point of 134° C. and 150° C. were isolated. This compound crystallized from ether.

*Analysis.*—$C_{21}H_{22}O_6$; molecular weight=370.4. Calculated: C, 68.09%; H, 5.99%. Found: C, 68.4%; H, 6.2%.

This compound is not described in the literature.

Step C.—Preparation of 1-hydroxymethyl desacetylamino colchicine 0.5 gm. of 1-formyl desacetylamino colchicine were dissolved in 5 cc. of methanol. The reaction mixture was cooled to +5° C. and 75 mg. of potassium borohydride were added thereto. The mixture was agitated for a period of a half hour at room temperature and then the pH was brought to 6 by the addition of acetic acid. The solution was extracted with methylene chloride and the extract was evaporated to dryness under vacuum.

The residue was crystallized from a mixture of ethyl acetate and ether (1:1) to obtain 300 mg. of 1-hydroxy-methyl desacetylamino colchicine having a melting point of 170° C.

*Analysis.*—$C_{21}H_{24}O_6$; molecular weight=372.4. Calculated: C, 67.7%; H, 6.5%. Found: C, 68.1%; H, 6.4%.

This compound is not described in the literature.

Example II.—Preparation of 1-hydroxymethyl desacetyl-amino iso-colchicine

Using the process of Example I, desacetylamino iso-colchicine prepared in Step A of Example I was reacted with 1,1-dichloromethyl methyl ether in the presence of stannic chloride and was then poured in water to obtain 1-formyl desacetylamino iso-colchicine which compound is not described in the literature.

The latter product was then reacted with potassium borohydride in methanol to form 1-hydroxymethyl des-acetylamino iso-colchicine which is not described in the literature.

Example III.—Preparation of 1-hydroxymethyl desacetyl-amino colchicine

Step A.—Preparation of a mixture of 1-formyl desacetyl-amino colchicine and 1-formyl desacetylamino iso-colchicine 2 gm. of the raw mixture of desacetylamino colchicine and desacetylamino iso-colchicine prepared in Step A of Example I in 20 cc. of methylene chloride was added to −5° C. and 5 cc. of first 1,1-dichloromethyl methyl ether and then 1.6 cc. of stannic chloride were added thereto. Using the separation procedure of Step B of Example I, there was obtained 2.2 gm. of a mixture of 1-formyl desacetylamino colchicine and 1-formyl desacetylamino iso-colchicine.

Step B.—Preparation of a mixture of 1-hydroxymethyl desacetylamino colchicine and 1-hydroxymethyl desacetylamino iso-colchicine 2.2 gm. of the mixture of 1-formyl desacetylamino colchicine and 1-formyl desacetylamino iso-colchicine obtained in Step A were reduced with potassium borohydride in methanol according to the method described in Step C of Example I to obtain 2.1 gm. of a mixture of 1-hydroxymethyl desacetylamino colchicine and 1-hydroxymethyl desacetylamino iso-colchicine. The mixture was subjected to chromatography through a column of magnesium silicate. The elution with methylene chloride containing 2% of methanol supplied 35% of 1-hydroxymethyl desacetylamino colchicine which was identical to the product obtained according to Example I. The residue was treated according to the method of Step C.

10 gm. of raw 1-hydroxymethyl desacetylamino iso-colchicine obtained in Step B by elution of the column were heated to 90° C. for a period of two hours with 100 cc. of 0.5 N hydrochloric acid. The reaction mixture was cooled and extracted with methylene chloride and the extract was washed with water and concentrated to obtain 1-hydroxymethyl desaceytlamino colchicine. The latter was directly treated with diazomethane in methylene chloride until an excess of the reactant persisted. The excess of the reactant was destroyed by the addition of acetic acid and the reaction mixture was evaporated to dryness under vacuum to obtain 9.2 gm. of a mixture of 1-hydroxymethyl desacetylamino iso-colchicine. This product was again subjected to chromatography according to the technique of Step B permitting thus the partial transformation of 1-hydroxymethyl desacetylamino iso-colchicine into 1-hydroxymethyl desacetylamino colchicine.

Example IV.—Preparation of 1-hydroxymethyl desacetylamino colchicine

Step A.—Preparation of 1-chloromethyl desacetylamino colchicine 1 gm. of desacetylamino colchicine obtained according to Step A of Example I was dissolved in 10 cc. of methylene chloride and 2.6 cc. of monochloromethyl methyl ether were added thereto. The reaction mixture was cooled to +5° C. and under agitation 0.5 cc. of stannic chloride were added. The temperature was allowed to rise to +20° C. and the agitation was continued for a period of one hour. Then the reaction mixture was poured upon ice and extracted with methylene chloride. The extract was evaporated to dryness under vacuum to obtain 1.1 gm. of 1-chloromethyl desacetylamino colchicine.

This compound is not described in the literature.

Step B.—1-hydroxymethyl desacetylamino colchicine

The 1-chloromethyl desacetylamino colchicine obtained above was dissolved in 20 cc. of acetone and 6 cc. of water and 2 gm. of barium carbonate were added thereto. The reaction mixture was agitated for a period of 24 hours at room temperature and filtered. The filtrate was extracted with methylene chloride and the extract was evaporated to dryness under vacuum. The residue was crystallized from a mixture of methyl acetate and ether (1:1) to obtain 1-hydroxymethyl desacetylamino cochicine which was identical to the product in Example I.

Example V.—1-hydroxymethyl desacetylamino thio-colchicine 100 mg. of 1-hydroxymethyl desacetylamino colchicine and 200 mg. of the sodium salt of methyl mercaptan were dissolved in 4 cc. of ethanol containing 50% of water and allowed to stand for 15 hours at room temperature. The reaction mixture was then poured into water saturated with sodium chloride. The aqueous mixture was acidified by the addition of acetic acid and extracted with methylene chloride. The extract was washed with water, dried over sodium sulfate and evaporated to dryness under vacuum. The residue was subjected to chromatography through alumina with elution with methylene chloride to obtain 60 mg. (40% yield) of 1-hydroxymethyl desacetylamino thio-colchicine which crystallized from ether to give a product having a melting point of 164° C.

This compound is not described in the literature.

Example VI.—1-hydroxymethyl desacetylamino N-methyl colchiceinamide 100 mg. of 1-hydroxymethyl desacetylamino colchicine were dissolved in 4 cc. of methanol containing 50% of water. 2 cc. of a 36% aqueous solution of methylamine were added thereto and the reaction mixture was allowed to stand for a period of 17 hours at room temperature. Thereafter the mixture was poured into water saturated with sodium chloride and the aqueous mixture was extracted with methylene chloride. The extract was washed with water, dried over sodium sulfate, filtered and evaporated to dryness under vacuum to obtain a 75% yield of 1-hydroxymethyl desacetylamino N-methyl colchiceinamide having a melting point of 178° C.

The compound is not described in the literature.

Example VII.—Desacetylamino thiocolchicine

By treating 100 mg. of desacetylamino colchicine with 200 mg. of the sodium salt of methyl mercaptan according to the method described in Example V, 90 mg. of desacetylamino thiocolchicine having a melting point of 140° C. were obtained, which product was crystallized from a mixture of ethyl acetate and isopropyl ether (1:1).

Example VIII.—Desacetylamino N-methyl colchiceinamide

By treating 100 mg. of desacetylamino colchicine with monomethylamine according to the method described in Example VI, 85 mg. of desacetylamino N-methyl colchiceinamide having a melting point of 210° C. were obtained.

Analysis.—$C_{20}H_{23}O_4N$; molecular weight=341.4. Calculated: C, 70.40%; H, 6.8%; N, 4.1%. Found: C, 70.6%; H, 6.8%; N, 4.2%.

This compound is not described in the literature.

Example IX.—1-formyl desacetylamino thiocolchicine 1 gm. of desacetylamino thiocolchicine was dissolved in 10 cc. of methylene chloride and 2.5 cc. of 1,1-dichloromethyl methyl ether were added thereto. The reaction mixture was cooled to 0° C. and 0.8 cc. of stannic chloride were added drop by drop. Thereafter, the reaction mixture was allowed to stand for a period of 3 hours at room temperature and after an extraction was conducted as in Example I, 1 gm. of raw 1-formyl desacetylamino thiocolchicine was obtained.

The compound is not described in the literature.

Example X.—1-hydroxymethyl desacetylamino thiocolchicine 1 gm. of raw 1-formyl desacetylamino thiocolchicine obtained in Example IX was dissolved in 10 cc. of methanol. The reaction mixture was cooled to +5° C. and 160 mg. of potassium borohydride were added thereto. Thereafter the reaction mixture was agitated for a period of two hours at room temperature and the procedure of Step C of Example I was followed to obtain 1-hydroxymethyl desacetylamino thiocolchicine having a melting point of 164° C. This product was identical to the product obtained according to Example V.

Example XI.—Preparation of 1-hydroxymethyl desacetylamino N-methyl colchiceinamide Step A.—1-formyl desacetylamino N-methyl colchiceinamide In a manner analogous to the procedure of Example IX, desacetylamine N-methyl colchiceinamide was formylated to obtain 1-formyl desacetylamino N-methyl colchiceinamide.

The compound is not described in the literature.

Step B.—1-hydroxymethyl desacetylamino-N-methyl colchiceinamide

The 1-formyl desacetylamino N-methyl colchiceinamide produced in Step A was reduced according to the method described in Example X to obtain 1-hydroxymethyl desacetylamino N-methyl colchiceinamide having a melting point of 178° C. This product was identical to the product obtained according to Example VI.

Various modifications of the process may be made without departing from the spirit or scope thereof and it is to be understood that the invention is intended to be limited only as defined in the appended claims.

We claim:

1. 1-hydroxymethyl desacetylamino colchicine compounds of the formula

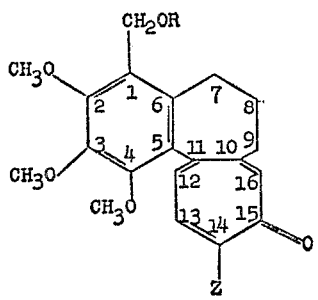

wherein R is selected from the group consisting of hydrogen, alkyl of 1 to 3 carbon atoms, an acyl and an acyloxy of an organic carboxylic acid of 1 to 18 carbon atoms selected from the group consisting of alkanoic acids, alkenoic acids, cycloalkyl carboxylic acids, cycloalkyl alkanoic acids, arylalkanoic acids, arylcarboxylic acid, phenoxy alkanoic acids, heterocyclic carboxylic acids of the group consisting of furane-2-carboxylic acid, 5-tert-butylfurane-2-carboxylic acid, 5-bromofurane-2-carboxylic acid, and nicotinic acid, $\beta$-ketoalkanoic acids and amino acids of the group consisting of diethylaminoacetic acid and aspartic acid and an anion of a mineral acid selected from the group consisting of nitric acid and phosphoric acid and Z is selected from the group consisting of —OCH$_3$, —OCH$_2$—CH$_3$, —SCH$_3$, —SCH$_2$—CH$_3$, and

wherein R' and R'' are selected from the group consisting of hydrogen, an alkyl radical having 1 to 8 carbon atoms, an aryl radical and an aralkyl radical and R' and R'' together with the nitrogen atom form a heterocyclic radical.

2. 1-hydroxymethyl desacetylamino colchicine.
3. 1-hydroxymethyl desacetylamino thiocolchicine.
4. 1-hydroxymethyl desacetylamino N-methyl colchiceinamide.
5. A process for the preparation of 1-hydroxymethyl desacetylamino colchicine compounds of the formula wherein R and Z have the definition of claim 1 which comprises reacting a desacetylamino colchicine of the formula

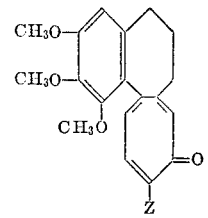

wherein Z has the above definition with 1,1-dichloromethyl methyl ether in the presence of stannic chloride followed by the addition of water to form the corresponding 1-formyl desacetylamino colchicine compound, reducing the latter with an alkali metal borohydride to form the corresponding 1-hydroxymethyl desacetylamino colchicine compound and recovering the desired product.

6. The process of claim 5 wherein the formylation is effected in the presence of a chlorinated organic solvent.

References Cited

UNITED STATES PATENTS

| | | | |
|---|---|---|---|
| 3,006,812 | 10/1961 | Wallace | 260—578 |
| 3,090,729 | 5/1963 | Bellet et al. | 71—121 |
| 3,194,835 | 7/1965 | Muller | 71—98 |

DANIEL D. HORWITZ, *Primary Examiner.*

CHARLES B. PARKER, *Examiner.*

R. V. HINES, *Assistant Examiner.*